United States Patent
Nam et al.

(10) Patent No.: US 10,547,848 B2
(45) Date of Patent: Jan. 28, 2020

(54) IMAGE DECODING METHOD AND APPARATUS IN IMAGE CODING SYSTEM

(71) Applicant: LG ELECTRONICS INC., Seoul (KR)

(72) Inventors: Junghak Nam, Seoul (KR); Chulkeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,374

(22) PCT Filed: Nov. 4, 2016

(86) PCT No.: PCT/KR2016/012632
§ 371 (c)(1),
(2) Date: May 3, 2018

(87) PCT Pub. No.: WO2017/078450
PCT Pub. Date: May 11, 2017

(65) Prior Publication Data
US 2018/0316922 A1    Nov. 1, 2018

Related U.S. Application Data

(60) Provisional application No. 62/251,058, filed on Nov. 4, 2015.

(51) Int. Cl.
*H04N 19/14* (2014.01)
*H04N 19/176* (2014.01)
*H04N 19/70* (2014.01)

(52) U.S. Cl.
CPC .......... *H04N 19/14* (2014.11); *H04N 19/176* (2014.11); *H04N 19/70* (2014.11)

(58) Field of Classification Search
CPC ........ H04N 19/14; H04N 19/82; H04N 19/44; H04N 19/86; H04N 19/103; H04N 19/70; H04N 19/176; H04N 19/117
See application file for complete search history.

(56) References Cited

U.S. PATENT DOCUMENTS

2013/0177068 A1   7/2013  Minoo et al.
2013/0315295 A1*  11/2013 Terada ................... H04N 19/20
                                                     375/240.01
(Continued)

FOREIGN PATENT DOCUMENTS

WO      2015007200 A1    1/2015

*Primary Examiner* — Tracy Y. Li
(74) *Attorney, Agent, or Firm* — Dentons US LLP

(57) ABSTRACT

An image decoding method performed by a decoding apparatus, according to the present invention, comprises the steps of: acquiring information on a first SAO and information on a second SAO of a current block through a bit stream; generating a reconstructed block of the current block; and performing an SAO procedure for the reconstructed block on the basis of the first SAO and the second SAO, wherein the information on the first SAO comprises first offset type information applied to the first SAO and first offset value information for n offset values, and the information on the second SAO comprises second offset type information applied to the second SAO and second offset value information for m offset values. According to the present invention, an efficient SAO procedure can be performed on the basis of a plurality of SAOs, and the video quality of images can be further improved.

14 Claims, 11 Drawing Sheets

(56) References Cited

U.S. PATENT DOCUMENTS

| | | | |
|---|---|---|---|
| 2014/0140416 A1* | 5/2014 | Yamazaki | H04N 19/70 375/240.25 |
| 2014/0177704 A1 | 6/2014 | Pu et al. | |
| 2014/0192860 A1 | 7/2014 | Onno et al. | |
| 2014/0301480 A1* | 10/2014 | Francois | H04N 19/85 375/240.25 |
| 2015/0124869 A1 | 5/2015 | Fu et al. | |

* cited by examiner

IMAGE DECODING METHOD AND APPARATUS IN IMAGE CODING SYSTEM

CROSS-REFERENCE TO RELATED APPLICATIONS

This application is the National Stage filing under 35 U.S.C. 371 of International Application No. PCT/KR2016/012632, filed on Nov. 4, 2016, which claims the benefit of U.S. Provisional Application No. 62/251,058 filed on Nov. 4, 2015, the contents of which are all hereby incorporated by reference herein in their entirety.

BACKGROUND OF THE INVENTION

Field of the Invention

The present invention relates to an image coding technology, and more particularly, to an image decoding method and apparatus in an image coding system.

Related Art

The need for images of high resolution and high quality has recently been increasing in various fields. As the resolution and quality of an image is improved, the amount of data in the image is also likewise increased.

Due to the increase in the amount of information, devices with various performance and networks of various environments are emerging. With the emergence of devices with diverse capabilities and networks of diverse environments, it has become possible to use the same content at varying levels of quality.

Specifically, due to the fact that the image quality that the terminal device can support is diversified, and the network environment that is constructed becomes various, in some environments, images of general quality are used, while, in other environments, images of higher quality are available.

For example, a consumer who purchases video content from a mobile terminal may view the same video content on a larger screen and with a higher resolution using a large screen for home use.

In recent years, as broadcasts with full high definition (FHD) resolution are being served, many users are already accustomed to the image of high resolution and high quality, and service providers and users are interested in use of services superior to Ultra High Definition (UHD) and FHD.

Accordingly, an image decoding method is required to further improve the subjective/objective image quality.

SUMMARY OF THE INVENTION

The present invention provides a method and apparatus for enhancing image coding efficiency.

The present invention also provides a method and apparatus for improving the subjective/objective image quality of a reconstructed picture.

The present invention also provides a decoding method and apparatus using a plurality of Sample Adaptive Offsets (SAOs) of a current block.

The present invention also provides a decoding method and apparatus using a plurality of edge offset-typed SAOs of a current block.

The present invention also provides a decoding method and apparatus using a plurality of band offset-typed SAOs of a current block.

The present invention also provides a decoding method and apparatus using a plurality of edge offset-typed SAOs of a current block and a plurality of band offset-typed SAOs of a current block.

According to an embodiment of the present invention, there is provided an image decoding method performed by an image decoder. The method includes obtaining information on a first Sample Adaptive Offset (SAO) and information on a second SAO of a current block through a bitstream, generating a reconstructed block of the current block, and performing an SAO procedure for the reconstructed block based on the first SAO and the second SAO, wherein the information on the first SAO comprises first offset type information applied to the first SAO and first offset value information on n offset values and the information on the second SAO comprises second offset type information applied to the second SAO and second offset value information on m offset values.

According to another embodiment of the present invention, there is provided a decoder performing inter prediction. The decoder includes an entropy decoder obtaining information on a first Sample Adaptive Offset (SAO) and information on a second SAO of a current block through a bitstream, a reconstructed block generator generating a reconstructed block of the current block, and a filter performing an SAO procedure for the reconstructed block based on the first SAO and the second SAO, wherein the information on the first SAO comprises first offset type information applied to the first SAO and first offset value information on n offset values and the information on the second SAO comprises second offset type information applied to the second SAO and second offset value information on m offset values.

According to another embodiment of the present invention, there is provided a video encoding method performed by an encoder. The method includes deriving a reconstructed block of a current block, generating information on a first SAO and information on a second SAO of the current block based on the reconstructed block and the original block of the current block, performing an SAO procedure for the reconstructed block based on the first SAO and the second SAO, and encoding and outputting information on the first SAO and information on the second SAO, wherein the information on the first SAO comprises first offset type information applied to the first SAO and first offset value information on n offset values and the information on the second SAO comprises second offset type information applied to the second SAO and second offset value information on m offset values.

According to another embodiment of the present invention, there is provided a video encoder. The encoder includes a reconstructed block generator deriving a reconstructed block of a current block, a filter generating information on a first SAO and information on a second SAO of the current block based on the reconstructed block and the original block of the current block, and performing an SAO procedure for the reconstructed block based on the first SAO and the second SAO, and an entropy encoder encoding and outputting information on the first SAO and information on the second SAO, wherein the information on the first SAO comprises first offset type information applied to the first SAO and first offset value information on n offset values and the information on the second SAO comprises second offset type information applied to the second SAO and second offset value information on m offset values.

According to an embodiment of the present invention, an SAO procedure can be performed on the reconstructed block based on a plurality of SAOs, thereby improving the video quality of an image.

According to an embodiment of the present invention, it is possible to efficiently perform the SAO procedure for a reconstructed block including a plurality of edges or a wide sample value distribution based on a plurality of SAOs, thereby improving the video quality of an image.

DESCRIPTION OF EXEMPLARY EMBODIMENTS

Figure 1:
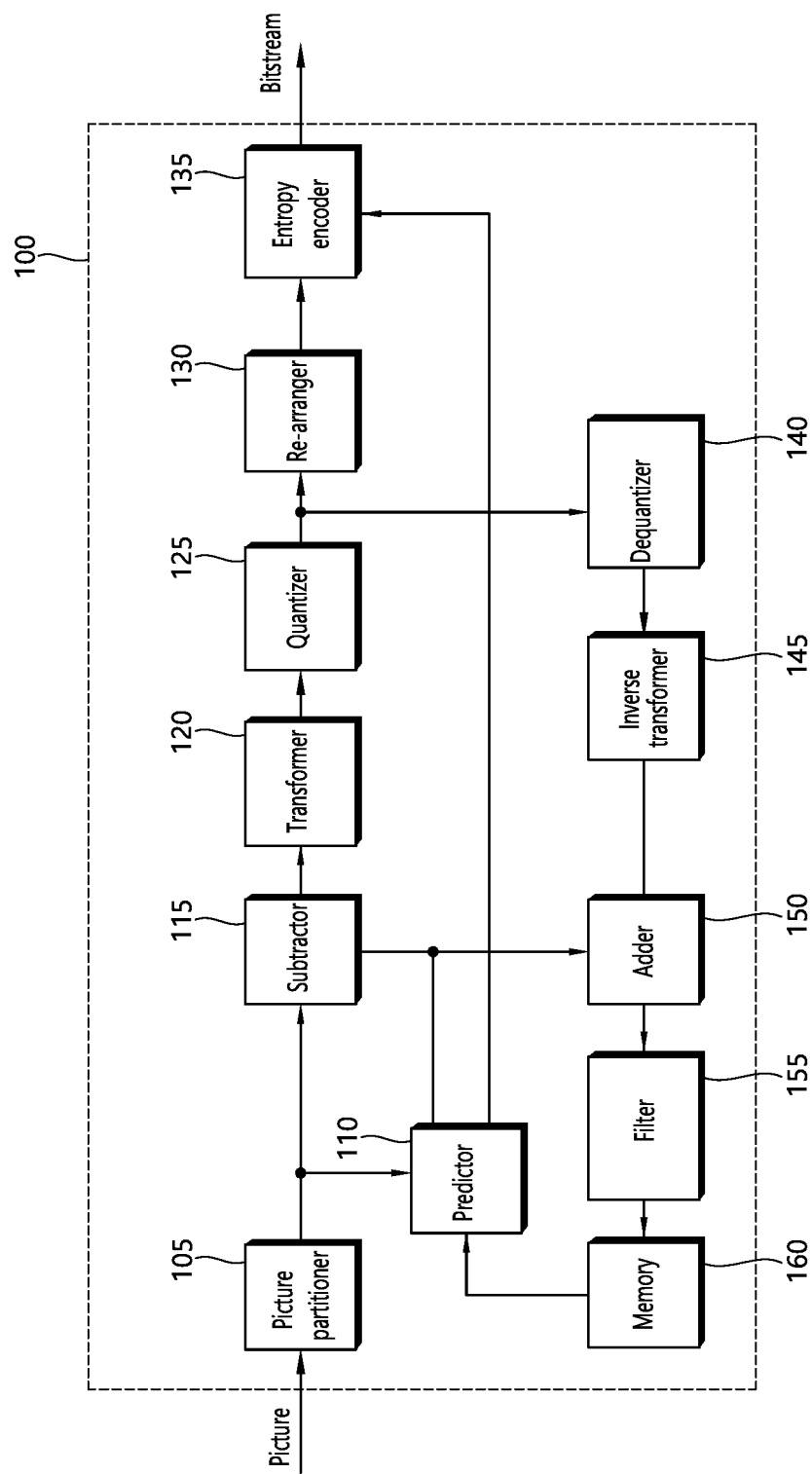
FIG. 1 is a schematic view illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioner 105, a predictor 110, a transformer 115, a quantizer 120, a re-arranger 125, an entropy encoder 130, a dequantizer 135, an inverse transformer 140, a filter 145, and a memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a lower depth as a quad-tree structures. The PU and TU may be obtained from the CU. For example, the PU may be partitioned from a CU into a symmetric or asymmetric square structure. Further, the TU may be split into a quad tree structure from the CU.

The predictor 110 includes an inter predictor that performs an inter prediction process and an intra predictor that performs an intra prediction process, as will be described later. The predictor 110 performs a prediction process on the processing units of a picture divided by the picture partitioner 105 to create a prediction block including a prediction sample or a prediction sample array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstructed block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoder.

The transformer 115 performs a transform process on the residual block in the unit of TUs and creates transform coefficients.

A transform block is a rectangular block of samples and is a block to which the same transform is applied. The transform block may be a TU and may have a quad-tree structure.

The transformer 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the re-arranger 125.

The re-arranger 125 may rearrange the transform coefficients supplied from the quantizer 120. By rearranging the quantization coefficients, it is possible to enhance the encoding efficiency in the entropy encoder 130.

The re-arranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the re-arranger 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called as a residual block in a block unit, and can be called as a residual sample in a sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Further, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, if necessary.

The dequantizer 135 dequantizes the values transform coefficients quantized by the quantizer 120. The inverse transformer 140 inversely transforms the values dequantized by the dequantizer 135.

The residual value or residual sample or residual sample array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular element reconstructed block generator that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
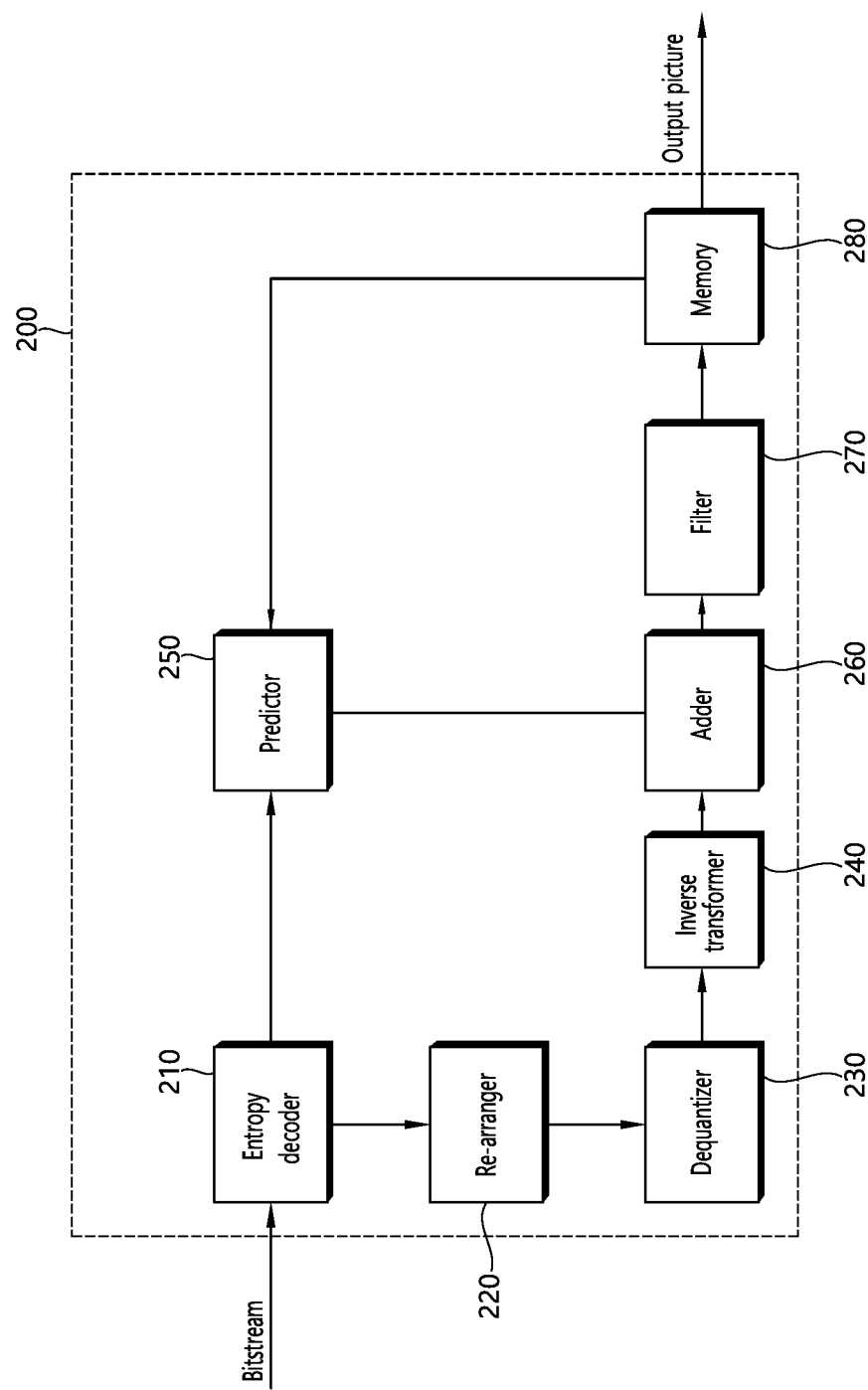
FIG. 2 is a schematic view illustrating a video decoder according to an embodiment of the invention.

FIG. 2 is a block diagram schematically illustrating a video decoder according to an embodiment of the invention. Referring to FIG. 2, a video decoder 200 may include an entropy decoder 210, a re-arranger 215, a dequantizer 220, an inverse transformer 225, a predictor 230, a filter 235, and a memory 240.

When a video bitstream is input from the video encoder, the input bitstream may be decoded on the basis of the order in which video information is processed by the video encoder.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoder 210 may perform decoding using the same VLC table as the encoder used in the encoder. Further, when CABAC is used to perform entropy encoding in a video encoder, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the re-arranger 215.

The re-arranger 215 may rearrange the bitstream information, that is, the quantized transform coefficients, entropy-decoded by the entropy decoder 210 on the basis of the rearrangement method in the video encoder.

The re-arranger 215 may reconstruct and rearrange the coefficients expressed in the form of a one-dimensional vector into coefficients in the form of a two-dimensional block. The re-arranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoder and the coefficient values of the rearranged block.

The inverse transformer 225 may perform the inverse DCT and/or inverse DST of the DCT and/or DST, which has been performed by the transformer of the video encoder, on the quantization result from the video encoder.

The inverse transform may be performed on the basis of a transfer unit or a partition unit of a picture determined by the video encoder. The transformer of the video encoder may selectively perform the DCT and/or DST depending on plural information pieces such as the prediction method, the size of a current block, and the prediction direction, and the inverse transformer 225 of the video decoder may perform the inverse transform on the basis of the transform information on the transform performed by the transformer of the video encoder.

The predictor 230 generates a prediction block including a prediction sample or a prediction sample array based on the prediction block generation-related information provided by the entropy decoder 210 and the previously decoded block and/or picture information provided from the memory 240.

If the prediction mode for the current PU is the intra prediction mode, the predictor 230 may perform the intra prediction to generate a prediction block based on pixel information in the current picture.

If the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In one example, when the merge mode is applied, the encoder and decoder may generate a merge candidate list using a motion vector for a reconstructed spatial neighboring block and/or is a motion vector corresponding to a Col block as a temporal neighboring block. In the merge mode, a motion vector of a candidate block selected from the merge candidate list is used as a motion vector of a current block. The encoder may transmit to the decoder a merge index indicating a candidate block having an optimal motion vector as selected from candidate blocks included in the merge candidate list. In this connection, the decoder may derive a motion vector for the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor, encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which blocks motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the predictor 230 and the residual block provided by the inverse-transformer 225. FIG. 2 illustrates that using the adder, the prediction block and the residual block are combined to generate the reconstructed block. In this connection, the adder may be viewed as a separate element (a reconstructed block generator) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

For a block that the skip mode is applied, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoder 210, the re-arranger 215, the dequantizer 220, the inverse transformer 225, the predictor 230, the filter 235 and the memory 240 which are included in the video decoder 200, for example, the entropy decoder 210, the re-arranger 215, the dequantizer 220, the inverse transformer 225, the predictor 230, the filter 235, and so on may be expressed as a decoder or a decoding unit that is distinguished from other elements.

In addition, the video decoder 200 may further include a parsing unit not shown in the drawing that parses information related to the encoded images included in a bitstream. The parsing unit may include the entropy decoder 210, and may be included in the entropy decoder 210. Such a parsing unit may also be implemented as an element of the decoding unit.

An in-loop filter may be applied to compensate for a blocking error and an error due to quantization which may occur in the coding process after the decoding of an image is completed in the image coding system as described above. A typical in-loop filter may include a deblocking filter, a SAO, an Adaptive Loop Filter (ALF), and the like. Particularly, the SAO is effective in reducing a ringing error that may occur as a unit of a coding unit and a unit of a conversion unit become larger. Also, the SAO is a procedure for restoring an offset difference from the original image by unit of pixel for an image on which deblocking filtering is performed. The coding error may be compensated through the SAO, and the coding error may be due to quantization or the like. In the SAO, there are two types of Band Offset (BO) type and Edge Offset (EO) type.

The encoding/decoder can improve the subjective/objective image quality of a reconstructed block and/or picture by applying the SAO, but it may be difficult to expect improvement of the subjective/objective image quality of the reconstructed block and/or picture by applying one SAO when a plurality of edge boundaries are included in one block or a sample value distribution is included by the encoding/decoding process. Accordingly, in this embodiment, a method of applying a plurality of SAOs to a current block is proposed. According to an embodiment of the present invention, a plurality of edge offset-typed SAOs and/or a plurality of band offset-typed SAOs may be applied to a current block to improve the performance of SAO, and thus the video quality of a reconstructed image can be improved.

As described above, the SAO type may be classified into the edge offset type and the band offset type. For example, the edge offset type can reduce an error occurring around an edge existing in a block, and the band offset type can compensate for a DC value generated by an error caused by quantization. Specifically, the edge offset type may apply an offset in consideration of edge information for each sample, for example, the direction of the edge based on a target sample and the sample values of the target sample and reference samples adjacent to the target sample. The band offset type may divide the range of the entire sample value into a certain number of bands, may select bands corresponding to the offset values to set a band group including the bands, and may apply the offset values corresponding to the bands to the sample corresponding to the band of the band group, i.e., the sample included in the sample value range of the band.

The encoder may generate, encode and output information on the SAO, and the information on the SAO may include offset type information. When the edge offset type indicated by the offset type information is represented, the decoder may derive an edge offset class of the SAO. The edge offset class may be preset, or may be derived as an edge offset class represented by edge offset information. The edge offset information indicating the edge offset class may be included in the information on the SAO.

Specifically, for example, the edge offset class may be classified into four kinds of edge offset classes. The edge offset class may be classified into four kinds of patterns according to the direction of the edge offset.

Figure 3:
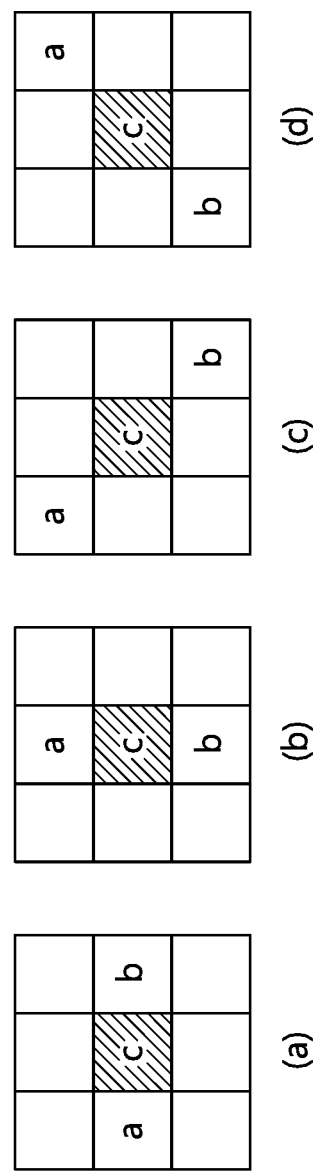
FIG. 3 is a view illustrating patterns for samples to which an edge offset-typed SAO is applied.

FIG. 3 is a view illustrating patterns for samples to which an edge offset-typed SAO is applied. Referring to FIGS. 3A to 3D, the pattern of the edge offset type may be classified according to the direction. Referring to FIGS. 3A to 3D, the positions of reference samples selected among neighboring samples of a target sample may be classified according to the direction based on the target sample to which the SAO is applied. c shown in FIG. 3 indicates the position of the target sample, and a and b indicate the positions of the reference samples.

FIG. 3A shows a pattern of a horizontal direction, FIG. 3B shows a pattern of a vertical direction, FIG. 3C shows a pattern of a diagonal direction of 135 degrees, and FIG. 3D shows a pattern of a diagonal direction of 45 degrees. The edge offset class may be classified into the above-mentioned patterns.

Figure 4:
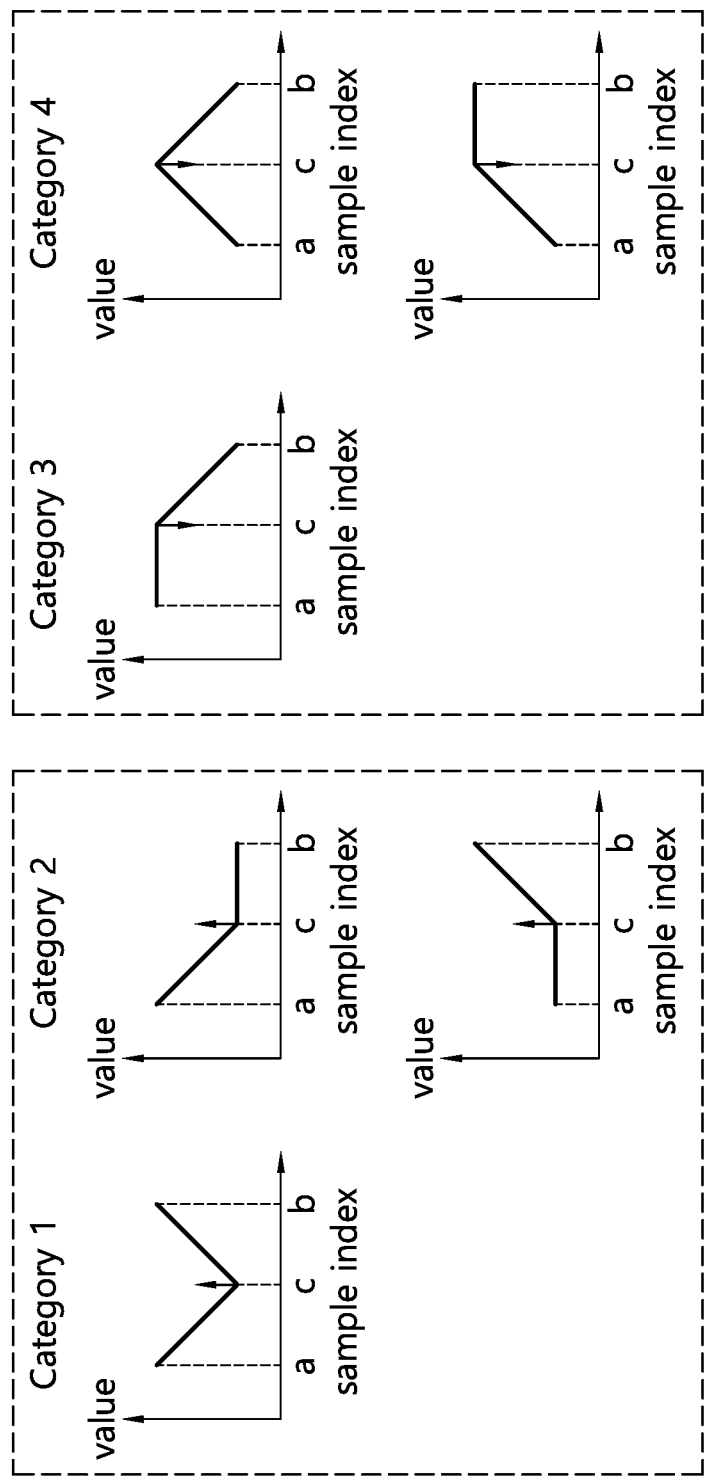
FIG. 4 is a view illustrating edge offset categories determined based on target samples and reference samples.

FIG. 4 is a view illustrating edge offset categories determined based on the target sample and the reference samples. Each of the edge offset classes may be divided into a plurality of edge offset categories for the target sample. The categories may be classified based on the relationship between the target sample and the reference samples of the target sample, and FIG. 4 shows an example of the classified categories.

Referring to FIG. 4, a category 1 may indicate that the sample values of the reference samples are larger than the sample value of the target sample, and a category 2 may indicate that the sample value of one of the reference samples is larger than the sample value of the target sample and the sample value of the other reference sample is equal to the sample value of the target sample. Also, a category 3 may indicate that the sample value of one of the reference samples is less than the sample value of the target sample and the sample value of the other the reference sample is equal to the sample value of the target sample, and a category 4 may indicate that the sample values of the reference samples are less than the sample value of the target sample.

On the other hand, when the SAO of the band offset type is applied, the encoder may divide the range of the sample values of the input image into an equal range of bands, may determine a band group including n bands among the bands, and may transmit offset values corresponding to the bands of the band group. For example, the range of sample values of the input image may be divided into 32 bands that are equal, and the encoder may select a band group including four bands among the 32 bands.

Figure 5:
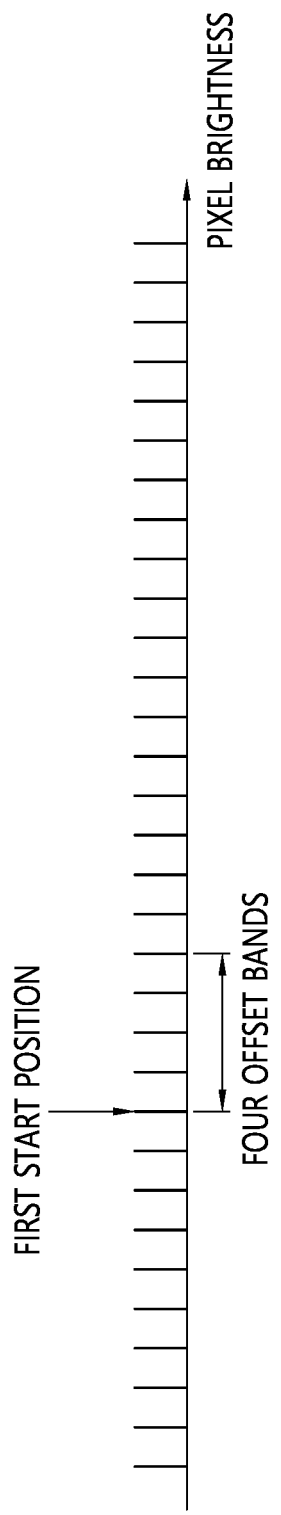
FIG. 5 is a view illustrating a band group of band offset-typed SAOs.

FIG. 5 is a view illustrating a band group of band offset-typed SAO. As shown in FIG. 5, the band group of band offset-typed SAO may include four consecutive bands. In this case, the encoder may transmit information indicating the first band to which the offset values are applied, i.e., a start band among the bands included in the band group, and may transmit, to the decoder, offset values corresponding to the four bands including the start band and the consecutive bands after the start band, i.e., the bands of the band group.

The type of SAO may be selected as one of the edge offset type and the band offset type by a Coding Tree Unit (CTU). In addition, the encoder may transmit n offset values for the SAO selected as the above-mentioned types, and specifically, may transmit 4 offset values for each type of SAOs.

Since the size of the coding unit used in the video coding system gradually increases, the CTU may include various types of edges or quantization errors. The present invention proposes a method of applying a plurality of SAOs to one coding unit.

A plurality of edge offset-typed SAOs which are the same edge offset class may be applied to a reconstructed block.

Figure 6:
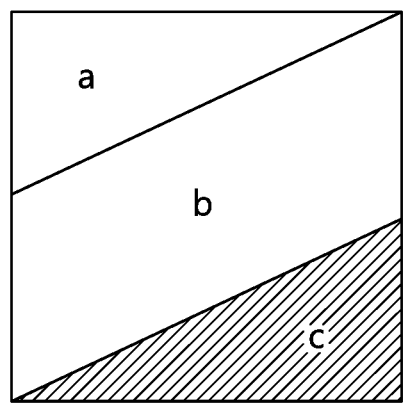
FIG. 6 is a view illustrating a reconstructed block including a plurality of edges in a block.

FIG. 6 is a view illustrating a reconstructed block including a plurality of edges in a block. As the size of the coding unit increases, a block including two or more edges having different edge characteristics may occur in one block. As shown in FIG. 6, a difference in sample values between region a and region b may not be relatively large, and a difference in sample values between region b and region c may be relatively large. Accordingly, offset values of different sizes may be applied by reflecting the characteristics of each edge. In this case, the encoder may transmit two SAOs for one block in order to improve the edge offset-typed SAO application performance.

Also, a plurality of band offset-typed SAOs may be applied to the reconstructed block. When a plurality of band offset-typed SAOs are applied in the case of the block shown in FIG. 6, there is a region having a large sample value difference based on the two edges shown in FIG. 6. Accordingly, a wider band group, i.e., an increase of the number of bands included in the band group is needed when the band offset-typed SAOs are used.

When a plurality of SAOs are applied as described above, the encoder may generate, encode and output a syntax element for the number of SAOs. The syntax may be as shown in Table 1 below.

TABLE 1

| | Descriptor |
|---|---|
| sao( rx, ry ){ <br> ... <br>     if( ( slice_sao_luma_flag && cIdx = = 0 ) \|\| <br>         ( slice sao chroma flag && cIdx > 0 ) ) { <br>      num sao minus1 <br>      for( j = 0; j < num sao minus1+1; j++ ) { <br>        if( cIdx = = 0 ) <br>          sao_type_idx_luma[j] <br>        else if( cIdx = = 1 ) <br>          sao type idx chroma[j] <br>        if( SaoTypeIdx[ cIdx ][ rx ][ ry ][j] != 0 ) { <br>          for( i = 0; i < 4; i++ ) <br>            sao_offset_abs[ cIdx ][ rx ][ ry ][j][ i ] <br>          if( SaoTypeIdx[ cIdx ][ rx ][ ry ] [j] = = 1 ) { <br>            for( i = 0; i < 4; i++ ) <br>              if( sao offset abs[ cIdx ][ rx ][ ry ] [j] [ i ] != 0 ) <br>                 sao_offset_sign[ cIdx ][ rx ][ ry ] [j] [ i ] <br>            sao_band_position[ cIdx ][ rx ][ ry ] [j] <br>          } else { <br>            if( cIdx = = 0 ) <br>              sao_eo_class_luma[j] <br>            if( cIdx = = 1 ) <br>              sao_co_class_chroma[j] <br>          } <br>        } <br>      } <br>     } <br> } | <br><br><br>ae(v)<br><br><br>ae(v)<br><br>ae(v)<br><br><br>ae(v)<br><br><br><br>ae(v)<br>ae(v)<br><br><br>ae(v)<br><br>ae(v) |

Here, the num_sao_minus1 syntax element may correspond to the syntax element for the number of SAOs, and the sao_type_idx_luma syntax element may correspond to the offset type information of the SAOs. Also, the sao_offset_abs syntax element may correspond to information on the size of the offset value of the SAOs, and the sao_offset_sign syntax element may correspond to information on the sign of the offset value of the SAOs.

The syntax element for the number of SAOs may indicate how many SAOs are present in the SAO procedure of the reconstructed block. The number of SAOs for the reconstructed block may be obtained by adding 1 to the value of the syntax element for the number of SAOs. For example, when the value of the syntax element is 1, the number of SAOs for the SAO procedure of the reconstructed block may be two.

When two SAOs are applied, both of the two SAOs may be edge offset types, or both of the two SAOs may be band offset type. Also, one of the two SAOs may be an edge offset type, and the other SAO may be a band offset type. The type of SAO may be derived based on the value of the sao_type_idx_luma syntax element.

Also, the sao_offset_abs syntax element which is the information on the size of the offset value actually applied according to the number of SAOs, and the sao_offset_sign syntax element which is the information on the sign of the offset value may be encoded as many as the number of the offset values.

On the other hand, when only the application of a maximum of two SAOs to the reconstructed block is allowed, the num_sao_minus1 syntax element may be replaced with a form of flag. For example, when the value of the flag is 0, one SAO may be applied to the reconstructed block, and when the value of the flag is 1, two SAOs may be applied to the reconstructed block.

In an embodiment where a plurality of SAOs are applied to the reconstructed block, when at least two SAOs are applied to the target block, both of the two SAOs may be derived as edge offset types according to the sao_type_idx_luma syntax element for each SAO. That is, the offset type information for the SAOs may both indicate edge offset types. In this case, the edge offset classes of the SAOs may be equal, or may be different from each other. When the edge offset classes of the SAOs are applied equally, the offset type information for at least one SAO may not be transmitted.

When the two SAOs are both edge offset types and the offset classes are the same, each edge offset category may have two offset values. In this case, the decoder may determine which one of the two offset values is applied to the sample in the decoding process of the target sample within the reconstructed block.

There are various methods for determining the offset value of the target sample in the decoding process. For example, the offset value may be determined based on a preset threshold in the coding process. Specifically, when an offset 1 that is an offset value of a first SAO and an offset 2 that is an offset value of a second SAO are derived and the threshold is preset to 1, the offset 1 may be applied when the absolute value of the difference value between the reference samples for each category is equal to or larger than 10, and the offset 2 may be applied when the absolute value is smaller than 10.

Also, the threshold may be calculated in unit of block without being preset. The standard deviation of the sample values of the reconstructed block on which the SAO process is to be performed may be obtained, and the standard deviation may be derived with the threshold. When the offset 1 that is the offset value of the first SAO and the offset 2 that is the offset value of the second SAO are derived and the standard deviation is obtained, the offset 1 may be applied when the absolute value of the difference value between the reference samples is equal to or larger than the standard deviation for each category, and the offset 2 may be applied when the absolute value is smaller than the standard deviation. The offset value of the target sample of the reconstructed block may be determined based on Equation 1 below.

$$\text{edge\_offset} = \begin{cases} \text{offset1}, & \text{if } \text{abs}(a-b) \geq \sigma \\ \text{offset2}, & \text{otherwise} \end{cases} \quad (1)$$

Here, edge_offset denotes an offset value to be applied to the target sample, and offset1 denotes an offset value of the first SAO. Also, offset2 denotes an offset value of the second SAO, and abs (a-b) denotes an absolute value of a difference value between reference samples of the target sample. In addition, σ denotes a standard deviation of the sample values of the reconstructed block. When the SAO procedure is performed on one reconstructed block based on a plurality of edge offset-typed SAOs as described above, the criteria for determining an SAO to be applied to the target sample among the SAOs may be defined based on the preset threshold or the standard deviation.

As another embodiment for performing the SAO procedure on the reconstructed block based on a plurality of SAOs, A plurality of edge offset-typed SAOs of different edge offset classes may be applied to one reconstructed block. In this case, the decoder may obtain edge offset class information included in information on each SAO through a bit stream, and may derive the edge offset classes of each SAO by decoding the edge offset class information. The decoder may determine which SAO among the SAOs having different edge offset classes is applied in the decoding process for the target sample in the reconstructed block.

Figure 7:
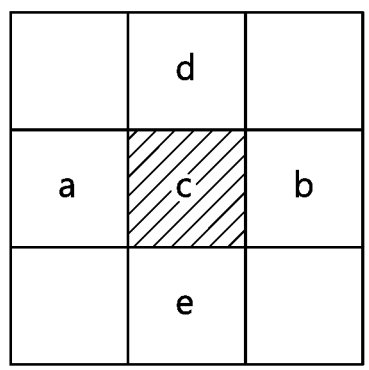
FIG. 7 is a view illustrating the target samples and reference samples according to different edge offset classes.

FIG. 7 is a view illustrating the target samples and reference samples according to different edge offset classes. Referring to FIG. 7, a first SAO having a first edge offset class in the horizontal direction and a second SAO having a second edge offset class in the vertical direction may be applied to the reconstructed block. It may be determined whether to apply the offset value of the first SAO or the offset value of the second SAO. That is, the offset value for the target sample within the reconstructed block may be determined. In order to determine the offset value, an absolute value of a difference value between reference samples according to the direction of each edge offset class may be used. The offset value may be determined based on Equation below.

$$\text{edge\_offset} = \begin{cases} \text{offset}_{hor}, & \text{if } \text{abs}(a-b) \geq \text{abs}(d-e) \\ \text{offset}_{ver}, & \text{otherwise} \end{cases} \quad (2)$$

Here, edge_offset denotes an offset value for the target sample, and $\text{offset}_{hor}$ denotes an offset value of the first SAO. Also, $\text{offset}_{ver}$ denotes an offset value of the second SAO, and a and b denote two reference samples according to the first offset class. In addition, d and e denote two reference samples according to the first offset class. When the absolute value of the difference value between the reference samples according to the first edge offset class of the horizontal direction is equal to or larger than the absolute value of the difference value between the reference samples according to the second edge offset class of the vertical direction, the first SAO may be applied to the target sample. When the absolute value of the difference value between the reference samples according to the first edge offset class is smaller than the absolute value of the difference value between the reference samples according to the second edge offset class, the second SAO may be applied to the target sample.

As another embodiment for performing an SAO procedure for a reconstructed block based on a plurality of SAOs, a plurality of band offset-typed SAOs may be applied to one reconstructed block. For example, the SAOs may include two SAOs.

Figure 8:
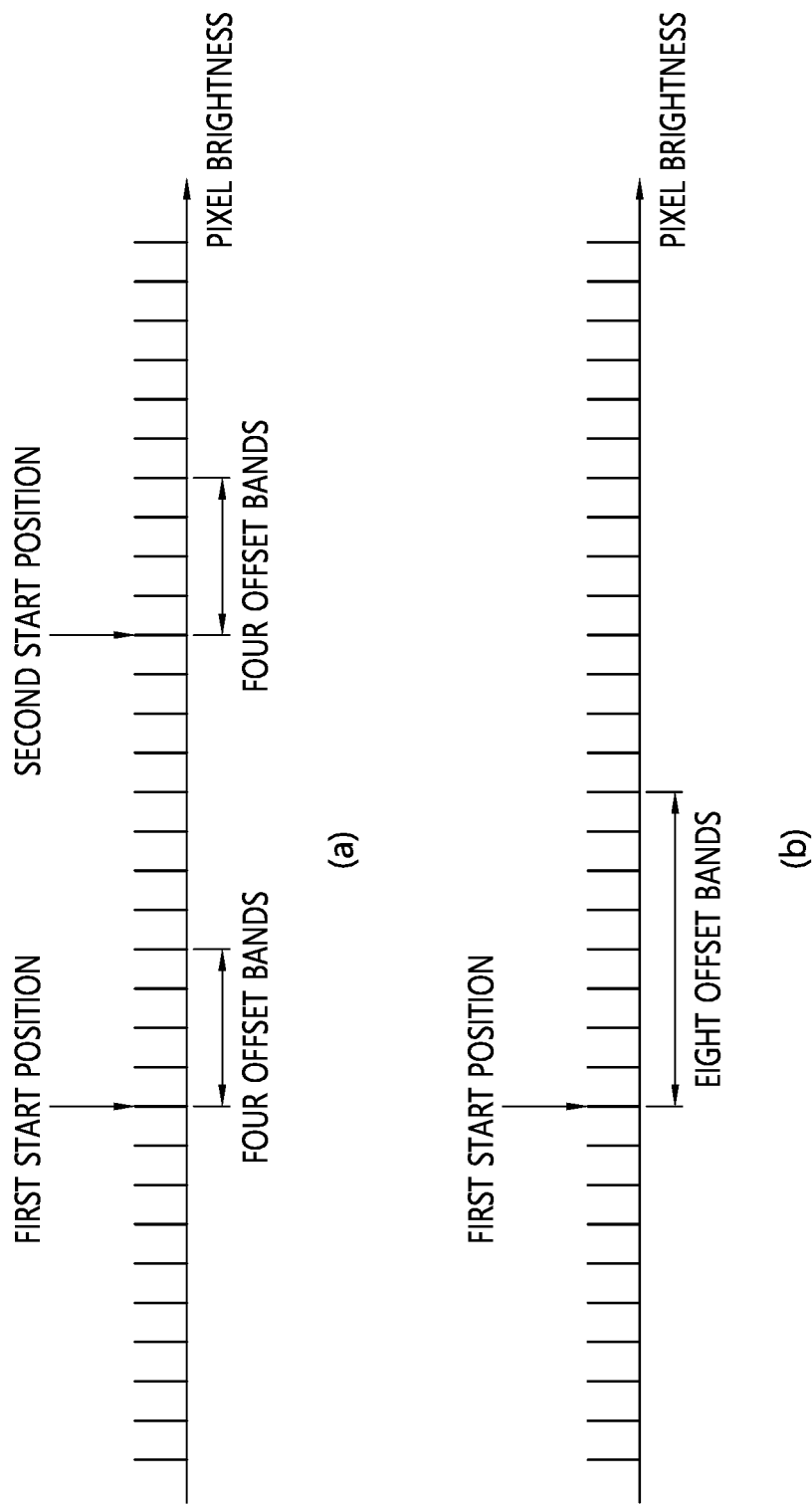
FIG. 8 is a view illustrating a band group of two SAOs for the reconstructed block.

FIG. 8 is a view illustrating a band group of two SAOs for the reconstructed block. When the number of bands covering a range of sample values to which SAO is applied among all N bands is n, the encoder transmits information indicating the first band among the n bands to the decoder. When the number of bands covered by the first SAO and the second SAO for the reconstructed block is four, as shown in FIG. 8A, the encoder may transmit information indicating a start band included in a first band group of a first SAO and four offset values from an offset value corresponding to the start band, and may transmit information indicating a start band included in a second band group of a second SAO and four offset values from an offset value corresponding to the start band. That is, when the reconstructed block includes different sample value distributions, two or more band offset-typed SAOs may be applied to two regions within the reconstructed block.

Also, as shown in FIG. 8B, the encoder may transmit information indicating a start band among bands included in one band group, and only the number of offset values corresponding to the bands included in the band group may be extended according to the value of the num_sao_minus syntax element transmitted from a higher level, e.g., the number of SAOs for the reconstructed block. As described above, when two SAOs are applied and each SAO band group includes four bands, eight offset values from the offset value corresponding to the start band may be transmitted.

As another embodiment of performing a SAO procedure on a reconstructed block based on a plurality of SAOs, both SAO of the edge offset type and SAO of the band offset type may be applied to one reconstructed block.

Figure 9:
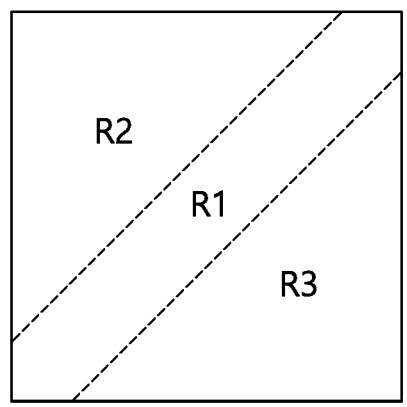
FIG. 9 is a view illustrating a method of applying an edge offset-typed SAO and a band offset-typed SAO together.

FIG. 9 is a view illustrating a method of applying an edge offset-typed SAO and a band offset-typed SAO together. As shown in FIG. 9, since an R1 region is a region including the edges, it may be effective to perform offset compensation through the SAO of the edge offset type. On the other hand, in regard to an R2 region and an R3 region where the change of the sample value is small, it may be effective to perform offset compensation through the SAO of the band offset type.

The decoder may select an SAO to be applied to the target sample among the SAO of the edge offset type and the SAO of the band offset type based on a preset threshold in the encoding/decoding process for the decoding of the target sample within the reconstructed block. An offset value for the target sample among the offset values of the selected SAO may be applied. The offset value for the target sample may be derived based on Equation below.

$$\text{offset} = \begin{cases} \text{offset}_{edge}, & \text{if } \text{abs}(a-b) \geq Th \\ \text{offset}_{band}, & \text{otherwise} \end{cases} \quad (3)$$

Here, $\text{offset}_{edge}$ denotes an offset value of SAO of the edge offset type, and $\text{offset}_{band}$ denotes an offset value of SAO of the band offset type. Also, Th denotes the threshold, and abs (a-b) denotes an absolute value of a difference value between the reference samples for the target sample according to the edge offset class of SAO of the edge offset type.

The decoder obtains a difference value between reference samples according to a direction corresponding to the edge offset class of SAO of the edge offset type for the target sample within the reconstructed sample, and when an absolute value of the difference value is equal to or larger than a threshold, the offset value of SAO of the edge offset type may be applied. When the absolute value is smaller than the threshold, the offset value of SAO of the band offset type may be applied. The threshold may be derived from the decoder like the method of using the standard deviation of the reconstructed block as the threshold, or may be set to a specific value in the encoding/decoding process.

Different band offset-typed SAOs may be applied even in the R2 region and the R3 region. In addition, when there are two or more edges in the reconstructed block, a plurality of edge offset-typed SAOs and one band offset-typed SAO may be applied to the reconstructed block. That is, when a plurality of SAOs for one reconstructed block are performed in the SAO procedure of the reconstructed block, determination criteria for selecting a SAO to be applied among the plurality of SAOs may be defined based on a threshold derived through a preset threshold or a standard deviation.

Figure 10:
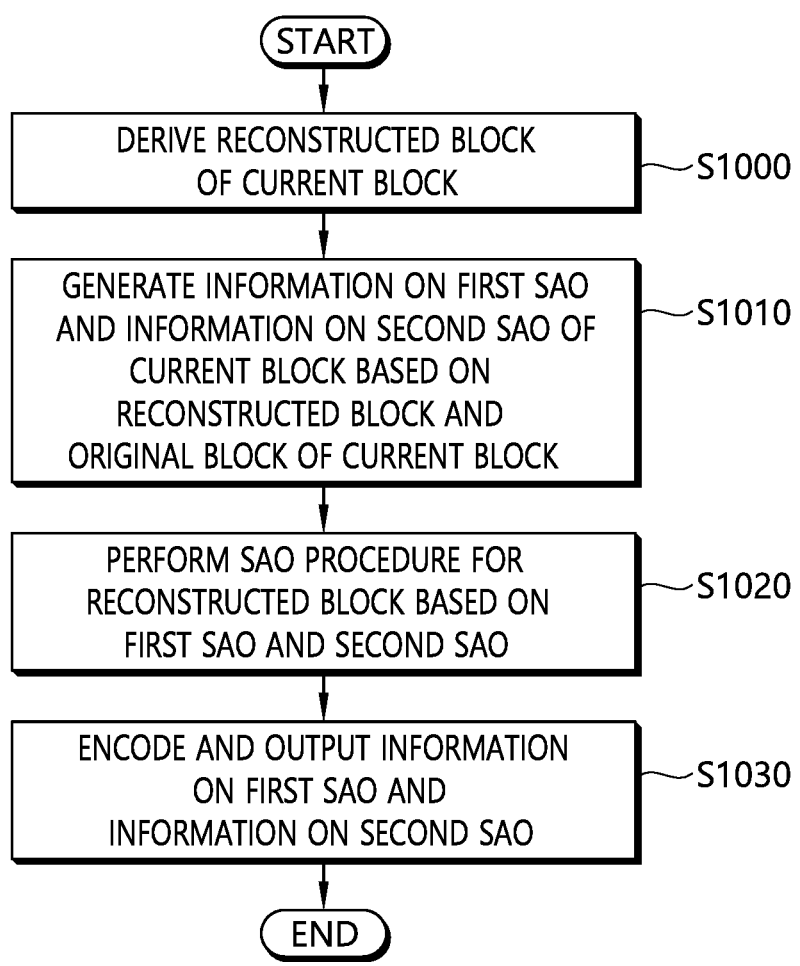
FIG. 10 is a schematic view illustrating a video encoding method by an encoder according to an embodiment of the present invention.

FIG. 10 is a schematic view illustrating a video encoding method by an encoder according to an embodiment of the present invention. The method disclosed in FIG. 10 may be performed by the encoder disclosed in FIG. 1. Specifically, for example, S1000 of FIG. 10 may be performed by a reconstructed block generator and/or a predictor of the encoder, and S1010 to S1020 may be performed by a filter of the encoder. Also, S1030 may be performed by an entropy encoder of the encoder.

The encoder generates a reconstructed block of a current block (S1000). The encoder may generate a prediction block of the current block through an intra prediction mode or an inter prediction mode. The encoder may immediately use the prediction block as the reconstructed block, or may add a residual signal to the prediction block to generate the reconstructed block.

The encoder generates information on a first SAO and information on a second SAO of the current block based on the reconstructed block and the original block of the current block (S1010). The encoder may determine an offset value by comparing the reconstructed block with the original block. The encoder may generate information on N SAOs for the current block. Specifically, for example, the encoder may generate information on two SAOs for the current block. The information on the first SAO may include first offset type information applied to the first SAO and first offset value information on n offset values, and the information on the second SAO may include second offset type information applied to the second SAO and second offset value information on m offset values. The values, n and m may be four. The first offset type information may represent one of an edge offset type and a band offset type, and the second offset type information may represent one of the edge offset type and the band offset type.

For example, both the first offset type information and the second offset type information may represent the edge offset type. In this case, the first edge offset class of the first SAO and the second edge offset class of the second SAO may be equal to each other. The encoder may generate first edge offset class information representing the first edge offset class and second edge offset class information representing the second edge offset class. The information on the first SAO may further include the first edge offset class information, and the information on the second SAO may further include the second edge offset class information. Alternatively, the first edge offset class of the first SAO and the second edge offset class of the second SAO may be preset to the same class, and the first edge offset class information and the second edge offset class information may not be generated.

The encoder may select an SAO for a target sample in the reconstructed block among the first SAO and the second SAO, and may set a threshold as a criterion for selecting the SAO. When the threshold is set in the encoding process, information on the threshold may be generated.

In addition, the first edge offset class of the first SAO and the second edge offset class of the second SAO may not be equal to each other. The encoder may generate the first edge offset class information representing the first edge offset class and the second edge offset class information representing the second edge offset class. The information on the first SAO may further include the first edge offset class information, and the information on the second SAO may further include the second edge offset class information.

As another example, both the first offset type information and the second offset type information may represent the band offset type. The encoder may generate band position information. Specifically, the encoder may generate one piece of band position information. The band position information may be information indicating a start band among bands included in a band group. The band group may include consecutive bands from the start band. The band group may include bands corresponding to n offset values of the first SAO and bands corresponding to m offset values of the second SAO.

In addition, the encoder may generate first band position information and second band position information. The first band position information may be information indicating a start band among the bands corresponding to the n offset values included in the first band group of the first SAO, and the second band position information may be information indicating a start band among the bands corresponding to the m offset values included in the second band group of the second SAO. The first band position information may be included in the information on the first SAO, and the second band position information may be included in the information on the second SAO.

As another example, the first offset type information may indicate an edge offset type and the second offset type information may indicate a band offset type. The encoder may generate first edge offset class information indicating the first edge offset class of the first SAO. The encoder may generate second band position information for the second band group of the second SAO. The band position information may be information indicating a start band among bands corresponding to the m offset values included in the second band group.

The encoder may select an SAO for the target sample in the reconstructed block among the first SAO and the second SAO, and may set a threshold as a criterion for selecting the SAO. When the threshold is set in the encoding process, information on the threshold may be generated.

On the other hand, the encoder may generate a syntax element for the number of SAOs for the reconstructed block. The syntax element for the number of SAOs may indicate the number of SAOs which the SAO procedure of the reconstructed block is performed based on. The number of SAOs for the reconstructed block may be obtained by adding 1 to the value of the syntax element for the number of SAOs. For example, when the value of the syntax element is 1, the number of SAOs for the SAO procedure of the reconstructed block may be two. Also, when the encoder determines only the application of a maximum of two SAOs to the reconstructed block, the syntax element may be replaced with a form of flag. In this case, when one SAO is applied to the reconstructed block, the value of the flag may be 0, and when two SAOs are applied to the reconstructed block, the value of the flag may be 1.

The encoder performs an SAO procedure for the reconstructed block based on the first SAO and the second SAO (S1020). The encoder may perform the SAO procedure according to the types represented by the first offset type information and the second offset type information which are generated.

For example, the first offset type information and the second offset type information both represent an edge offset type, and the first edge offset class may have the same class as the second edge offset class. In this case, the encoder may set a threshold for a target sample in the reconstructed block. The threshold may be a preset specific value, or may also be a value set in the encoding process. Alternatively, the threshold may be a standard deviation of a sample value of the reconstructed block.

When the threshold is set, the encoder may derive an absolute value of a difference value between two reference samples according to the class. When the direction of the class is vertical, the upper and lower neighboring samples of the target sample may be included in the reference samples. When the direction of the class is horizontal, the left and right neighboring samples of the target sample may be included in the reference samples. When the direction of the class is a 135-degree diagonal direction, the left upper neighboring sample and the right lower neighboring sample of the target sample may be included in the reference samples. When the direction of the class is a 45-degree diagonal direction, the right upper neighboring sample and the left lower neighboring sample of the target sample may be included in the reference samples.

When the absolute value of the difference value between the reference samples is derived, the encoder may select one of the first SAO and the second SAO based on the absolute value. For example, when the absolute value is equal to or larger than the threshold, the encoder may select the first SAO, and when the absolute value is smaller than the threshold, the encoder may select the second SAO.

After selecting the SAO, the encoder may determine an edge offset category for the target sample based on the two reference samples and the target sample. The edge offset category may be classified into four categories including category 1, category 2, category 3, and category 4. The category 1 may indicate that the sample values of the reference samples are larger than the sample value of the target sample. The category 2 may indicate that the sample value of one of the reference samples is larger than the sample value of the target sample, and the sample value of the other of the reference samples may be equal to the sample value of the target sample. The category 3 may indicate that the sample value of one of the reference samples is smaller than the sample value of the target sample and the sample value of the other one of the reference samples is equal to the sample value of the target sample. Also, the category 4 may indicate that the sample values of the reference samples are smaller than the sample value of the target sample.

When determining the edge offset category for the target sample, the encoder may apply an offset value corresponding to the category among the offset values of the selected SAO to the target sample.

As another example, there may be a case where the first offset type information and the second offset type information both represent an edge offset type and the first edge offset class has a class that is not equal to the second edge offset class. In this case, the encoder may derive a first absolute value of the difference value between the two reference samples according to the first edge offset class and a second absolute value of the difference value between the two reference samples according to the second edge offset class. The first edge offset class and the second edge offset class do not have the same direction but may each have one of the vertical direction, the horizontal direction, the 135-degree direction, and the 45-degree direction.

When the direction of the class is vertical, the upper and lower neighboring samples of the target sample may be included in the reference samples. When the direction of the class is horizontal, the left and right neighboring samples of the target sample may be included in the reference samples. When the direction of the class is a 135-degree diagonal direction, the left upper neighboring sample and the right lower neighboring sample of the target sample may be included in the reference samples. When the direction of the class is a 45-degree diagonal direction, the right upper neighboring sample and the left lower neighboring sample of the target sample may be included in the reference samples.

When the first absolute value and the second absolute value are derived, the encoder may select one of the first SAO and the second SAO based on the first absolute value and the second absolute value. For example, when the first absolute value is equal to or larger than the second absolute value, the encoder may select the first SAO, and when the first absolute value is smaller than the second absolute value, the encoder may select the second SAO.

After selecting the SAO, the encoder may determine an edge offset category for the target sample based on the two reference samples and the target sample. The edge offset category may be classified into four categories including category 1, category 2, category 3, and category 4. The category 1 may indicate that the sample values of the reference samples are larger than the sample value of the target sample. The category 2 may indicate that the sample value of one of the reference samples is larger than the sample value of the target sample, and the sample value of the other of the reference samples may be equal to the sample value of the target sample. The category 3 may indicate that the sample value of one of the reference samples is smaller than the sample value of the target sample and the sample value of the other one of the reference samples is equal to the sample value of the target sample. Also, the category 4 may indicate that the sample values of the reference samples are smaller than the sample value of the target sample.

When determining the edge offset category for the target sample, the encoder may apply an offset value corresponding to the category among the offset values of the selected SAO to the target sample.

As another example, there may be a case where both the first offset type information and the second offset type information represent a band offset type. When generating one piece of band position information, the encoder may derive a band group including bands corresponding to n offset values of a first SAO and bands corresponding to m offset values of a second SAO. The band group may be represented as a set of consecutive bands from a start band indicated by the band position information. When the band group is derived, the encoder may apply an offset value corresponding to the band among the (n+m) offset values to a sample corresponding to the band of the band group. That is, when the sample value of the corresponding sample falls within the range of the sample value of the band, the offset value corresponding to the band may be applied.

Also, when generating the first band position information of the first SAO and the second band position information of the second SAO, the encoder may derive the first band group and the second band group. The band groups may be represented as a set of consecutive bands from a start band indicated by the band position information corresponding to the band groups. When the first band group and the second band group are derived, the encoder may apply an offset value corresponding to the first band among the n offset values to the first sample corresponding to the first band of the first band group, and may apply an offset value corresponding to the second band among the m offset values to the second sample corresponding to the second band of the second band group. That is, when the sample value of the corresponding sample falls within the range of the sample value of the band, the offset value corresponding to the band may be applied.

As another example, there may be a case where the first offset type information represents an edge offset type and the second offset type information represents a band offset type. In this case, the encoder may set a threshold for a target sample in the reconstructed block. The threshold may be a preset specific value, or may be generated in the encoding process. Alternatively, the threshold may be a standard deviation of a sample value of the reconstructed block.

When the threshold is set, the encoder may derive an absolute value of a difference value between two reference samples according to the edge offset class of the first SAO. When the direction of the class is vertical, the upper and lower neighboring samples of the target sample may be included in the reference samples. When the direction of the class is horizontal, the left and right neighboring samples of the target sample may be included in the reference samples. When the direction of the class is a 135-degree diagonal direction, the left upper neighboring sample and the right lower neighboring sample of the target sample may be included in the reference samples. When the direction of the class is a 45-degree diagonal direction, the right upper neighboring sample and the left lower neighboring sample of the target sample may be included in the reference samples.

When the absolute value of the difference value between the reference samples is derived, the encoder may select one of the first SAO and the second SAO based on the absolute value. For example, when the absolute value is equal to or larger than the threshold, the encoder may select the first SAO, and when the absolute value is smaller than the threshold, the encoder may select the second SAO.

When the first SAO is selected, the encoder may determine an edge offset category for the target sample based on the two reference samples and the target sample. The edge offset category may be classified into four categories including category 1, category 2, category 3, and category 4. The category 1 may indicate that the sample values of the reference samples are larger than the sample value of the target sample. The category 2 may indicate that the sample value of one of the reference samples is larger than the sample value of the target sample, and the sample value of the other of the reference samples may be equal to the sample value of the target sample. The category 3 may indicate that the sample value of one of the reference samples is smaller than the sample value of the target sample and the sample value of the other one of the reference samples is equal to the sample value of the target sample.

Also, the category 4 may indicate that the sample values of the reference samples are smaller than the sample value of the target sample.

When determining the edge offset category for the target sample, the encoder may apply an offset value corresponding to the category among the offset values of the first SAO to the target sample.

When the second SAO is selected, the encoder may derive a band group including bands corresponding to m offset values of the second SAO. The band group may be represented as a set of consecutive bands from a start band indicated by the second band position information. When the band group is derived, the encoder may apply an offset value corresponding to the band among the m offset values to a sample corresponding to the band of the band group. That is, when the sample value of the corresponding sample falls within the range of the sample value of the band, the offset value corresponding to the band may be applied.

The encoder encodes the information on the first SAO and the information on the second SAO and outputs the encoded information (S1030). The encoder may generate the information on the first SAO and the information on the second SAO, and may encode and output the information in a form of a bit stream. The information on the first SAO may include first offset type information applied to the first SAO and first offset value information on n offset values, and the information on the second SAO may include information on second offset type information applied to the second SAO and second offset value information on m offset values.

When both the first offset type information and the second offset type information represent edge offset types, the information on the first SAO may further include first edge offset class information representing a first edge offset class of the first SAO and the information on the second SAO may further include second edge offset class information representing a second edge offset class of the second SAO. On the other hand, when the first edge offset class and the second edge offset class are preset to the same class, the first edge offset class information and the second edge offset class information may not be outputted.

When both the first offset type information and the second offset type information represent band offset types, the information on the first SAO may further include first band position information, and the information on the second SAO may further include second band position information. The first band position information may be information indicating a start band of bands corresponding to the n offset values included in the first band group of the first SAO, and the second band position information may be information indicating a start band among bands corresponding to the m offset values included in the second band group of the second SAO. On the other hand, when the bands of the first SAO and the bands of the second SAO are included in one band group, the encoder may generate, encode, and output one band position information.

When the first offset type information represents an edge offset type and the second offset type information represents a band offset type, the information on the first SAO may further include first edge offset class information representing the first edge offset class of the first SAO, and the information on the second SAO may further include second band position information. The second band position information may be information indicating a start band among bands corresponding to the m offset values included in the second band group of the second SAO.

Also, the encoder may generate and encode a syntax element representing the number of SAOs for the reconstructed block, and may output the syntax element in a form of the bitstream. When the number of SAOs is limited to two, the syntax element may be replaced with a form of flag.

Figure 11:
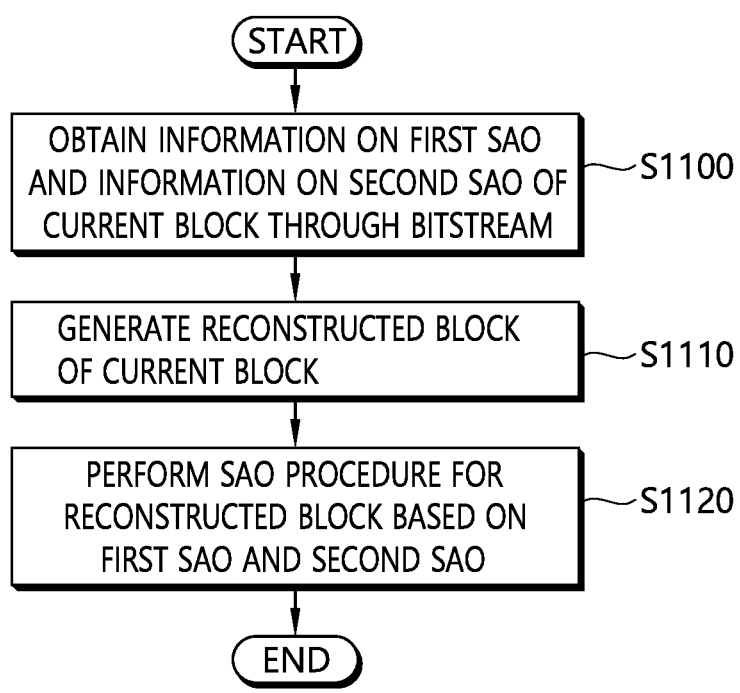
FIG. 11 is a schematic view illustrating a video decoding method by a decoder according to an embodiment of the present invention.

FIG. 11 is a schematic view illustrating a video decoding method by a decoder according to an embodiment of the present invention. The method disclosed in FIG. 11 may be performed by the decoder disclosed in FIG. 2. Specifically, for example, S1100 of FIG. 11 may be performed by the entropy decoder of the decoder, and S1110 may be performed by the reconstructed block generator and/or the predictor of the decoder. Also, S1120 may be performed by the filter of the decoder.

The decoder obtains information on a first SAO and information on a second SAO of a current block through a bitstream (S1100). The decoder may obtain the information on the first SAO and the information on the second SAO through the bitstream. The information on the first SAO may include first offset type information applied to the first SAO and first offset value information on n offset values, and the information on the second SAO may include information on second offset type information applied to the second SAO and second offset type information applied to the second SAP and second offset value information on m offset values.

When both the first offset type information and the second offset type information represent edge offset types, the information on the first SAO may further include first edge offset class information representing a first edge offset class of the first SAO and the information on the second SAO may further include second edge offset class information representing a second edge offset class of the second SAO. On the other hand, when the first edge offset class and the second edge offset class are preset to the same class, the first edge offset class information and the second edge offset class information may not be outputted.

When both the first offset type information and the second offset type information represent band offset types, the information on the first SAO may further include first band position information, and the information on the second SAO may further include second band position information. The first band position information may be information indicating a start band of bands corresponding to the n offset values included in the first band group of the first SAO, and the second band position information may be information indicating a start band among bands corresponding to the m offset values included in the second band group of the second SAO. On the other hand, when the bands of the first SAO and the bands of the second SAO are included in one band group, the decoder may obtain one band position information through a bitstream. The band position information may be information indicating a start band among bands included in the band group, and the band group may include bands corresponding to the n offset values of the first SAO and may include bands corresponding to the m offset values of the second SAO.

When the first offset type information represents an edge offset type and the second offset type information represents a band offset type, the information on the first SAO may further include first edge offset class information representing the first edge offset class of the first SAO, and the information on the second SAO may further include second band position information. The second band position information may be information indicating a start band among bands corresponding to the m offset values included in the second band group of the second SAO.

Also, the decoder may obtain a syntax element representing the number of SAOs for the reconstructed block through a bitstream. A value obtained by adding 1 to the value of the syntax element may be equal to the number of SAOs for the reconstructed block. The decoder may derive the number of SAOs for the reconstructed block based on the syntax element. Also, when the number of SAOs is limited to two, the syntax element may be replaced with a form of flag. In this case, when the value of the flag is 0, the number of SAOs for the reconstructed block may be one, and when the value of the flag is 1, the number of SAOs for the reconstructed block may be two.

The decoder generates a reconstructed block of the current block (S1110). The decoder may generate a prediction block of the current block through an intra prediction mode or an inter prediction mode. The decoder may immediately use the prediction block as the reconstructed block, or may add a residual signal to the prediction block to generate the reconstructed block.

The decoder performs an SAO procedure for the reconstructed block based on the first SAO and the second SAO (S1120). The decoder may perform the SAO procedure according to the types represented by the first offset type information and the second offset type information.

For example, the first offset type information and the second offset type information both represent an edge offset type, and the first edge offset class may have the same class as the second edge offset class. In this case, the decoder may derive a threshold for a target sample in the reconstructed block. The threshold may be a preset specific value, or may be obtained through the bitstream. Alternatively, the threshold may be a standard deviation of a sample value of the reconstructed block.

When the threshold is derived, the decoder may derive an absolute value of a difference value between two reference samples according to the class. When the direction of the class is vertical, the upper and lower neighboring samples of the target sample may be included in the reference samples. When the direction of the class is horizontal, the left and right neighboring samples of the target sample may be included in the reference samples. When the direction of the class is a 135-degree diagonal direction, the left upper neighboring sample and the right lower neighboring sample of the target sample may be included in the reference samples. When the direction of the class is a 45-degree diagonal direction, the right upper neighboring sample and the left lower neighboring sample of the target sample may be included in the reference samples.

When the absolute value of the difference value between the reference samples is derived, the decoder may select one of the first SAO and the second SAO based on the absolute value. For example, when the absolute value is equal to or larger than the threshold, the decoder may select the first SAO, and when the absolute value is smaller than the threshold, the decoder may select the second SAO.

After selecting the SAO, the decoder may determine an edge offset category for the target sample based on the two reference samples and the target sample. The edge offset category may be classified into four categories including category 1, category 2, category 3, and category 4. The category 1 may indicate that the sample values of the reference samples are larger than the sample value of the target sample. The category 2 may indicate that the sample value of one of the reference samples is larger than the sample value of the target sample, and the sample value of the other of the reference samples may be equal to the sample value of the target sample. The category 3 may indicate that the sample value of one of the reference samples is smaller than the sample value of the target sample and the sample value of the other one of the reference samples is equal to the sample value of the target sample. Also, the category 4 may indicate that the sample values of the reference samples are smaller than the sample value of the target sample.

When determining the edge offset category for the target sample, the decoder may apply an offset value corresponding to the category among the offset values of the selected SAO to the target sample.

As another example, there may be a case where the first offset type information and the second offset type information both represent an edge offset type and the first edge offset class has a class that is not equal to the second edge offset class. In this case, the decoder may derive a first absolute value of the difference value between the two reference samples according to the first edge offset class and a second absolute value of the difference value between the two reference samples according to the second edge offset class. The first edge offset class and the second edge offset class do not have the same direction but may each have one of the vertical direction, the horizontal direction, the 135-degree direction, and the 45-degree direction.

When the direction of the class is vertical, the upper and lower neighboring samples of the target sample may be included in the reference samples. When the direction of the class is horizontal, the left and right neighboring samples of the target sample may be included in the reference samples. When the direction of the class is a 135-degree diagonal direction, the left upper neighboring sample and the right lower neighboring sample of the target sample may be included in the reference samples. When the direction of the class is a 45-degree diagonal direction, the right upper neighboring sample and the left lower neighboring sample of the target sample may be included in the reference samples.

When the first absolute value and the second absolute value are derived, the decoder may select one of the first SAO and the second SAO based on the first absolute value and the second absolute value. For example, when the first absolute value is equal to or larger than the second absolute value, the decoder may select the first SAO, and when the first absolute value is smaller than the second absolute value, the decoder may select the second SAO.

After selecting the SAO, the decoder may determine an edge offset category for the target sample based on the two reference samples and the target sample. The edge offset category may be classified into four categories including category 1, category 2, category 3, and category 4. The category 1 may indicate that the sample values of the reference samples are larger than the sample value of the target sample. The category 2 may indicate that the sample value of one of the reference samples is larger than the sample value of the target sample, and the sample value of the other of the reference samples may be equal to the sample value of the target sample. The category 3 may indicate that the sample value of one of the reference samples is smaller than the sample value of the target sample and the sample value of the other one of the reference samples is equal to the sample value of the target sample. Also, the category 4 may indicate that the sample values of the reference samples are smaller than the sample value of the target sample.

When determining the edge offset category for the target sample, the decoder may apply an offset value corresponding to the category among the offset values of the selected SAO to the target sample.

As another example, there may be a case where both the first offset type information and the second offset type information represent a band offset type. When obtaining one piece of band position information, the decoder may derive a band group including bands corresponding to n offset values of a first SAO and bands corresponding to m offset values of a second SAO based on the band position information. The band group may be represented as a set of consecutive bands from a start band indicated by the band position information. When the band group is derived, the decoder may apply an offset value corresponding to the band among the (n+m) offset values to a sample corresponding to the band of the band group. That is, when the sample value of the corresponding sample falls within the range of the sample value of the band, the offset value corresponding to the band may be applied.

Also, when obtaining the first band position information of the first SAO and the second band position information of the second SAO, the decoder may derive the first band group based on the first band position information and the second band group based on the second band position information. The band groups may be represented as a set of consecutive bands from a start band indicated by the band position information corresponding to the band groups. When the first band group and the second band group are derived, the decoder may apply an offset value corresponding to the first band among the n offset values to the first sample corresponding to the first band of the first band group, and may apply an offset value corresponding to the second band among the m offset values to the second sample corresponding to the second band of the second band group. That is, when the sample value of the corresponding sample falls within the range of the sample value of the band, the offset value corresponding to the band may be applied.

As another example, there may be a case where the first offset type information represents an edge offset type and the second offset type information represents a band offset type. In this case, the decoder may derive a threshold for a target sample in the reconstructed block. The threshold may be a preset specific value, or may be obtained through the bitstream. Alternatively, the threshold may be a standard deviation of a sample value of the reconstructed block.

When the threshold is derived, the decoder may derive an absolute value of a difference value between two reference samples according to the edge offset class of the first SAO. When the direction of the class is vertical, the upper and lower neighboring samples of the target sample may be included in the reference samples. When the direction of the class is horizontal, the left and right neighboring samples of the target sample may be included in the reference samples. When the direction of the class is a 135-degree diagonal direction, the left upper neighboring sample and the right lower neighboring sample of the target sample may be included in the reference samples. When the direction of the class is a 45-degree diagonal direction, the right upper neighboring sample and the left lower neighboring sample of the target sample may be included in the reference samples.

When the absolute value of the difference value between the reference samples is derived, the decoder may select one of the first SAO and the second SAO based on the absolute value. For example, when the absolute value is equal to or larger than the threshold, the decoder may select the first SAO, and when the absolute value is smaller than the threshold, the decoder may select the second SAO.

When the first SAO is selected, the decoder may determine an edge offset category for the target sample based on the two reference samples and the target sample. The edge offset category may be classified into four categories including category 1, category 2, category 3, and category 4. The category 1 may indicate that the sample values of the reference samples are larger than the sample value of the target sample. The category 2 may indicate that the sample value of one of the reference samples is larger than the sample value of the target sample, and the sample value of the other of the reference samples may be equal to the sample value of the target sample. The category 3 may indicate that the sample value of one of the reference samples is smaller than the sample value of the target sample and the sample value of the other one of the reference samples is equal to the sample value of the target sample. Also, the category 4 may indicate that the sample values of the reference samples are smaller than the sample value of the target sample.

When determining the edge offset category for the target sample, the decoder may apply an offset value corresponding to the category among the offset values of the first SAO to the target sample.

When the second SAO is selected, the decoder may derive a band group including bands corresponding to m offset values of the second SAO based on the band position information of the second SAO. The band group may be represented as a set of consecutive bands from a start band indicated by the second band position information. When the band group is derived, the decoder may apply an offset value corresponding to the band among the m offset values to a sample corresponding to the band of the band group. That is, when the sample value of the corresponding sample falls within the range of the sample value of the band, the offset value corresponding to the band may be applied.

The decoder may perform the SAO procedure on the reconstructed block to generate a modified reconstructed block. The modified reconstructed block is stored in a memory, and may be used for intra prediction and/or inter prediction later.

According to an embodiment of the present invention, an SAO procedure can be performed on the reconstructed block based on a plurality of SAOs, thereby improving the video quality of an image.

In addition, according to an embodiment of the present invention, it is possible to efficiently perform the SAO procedure for a reconstructed block including a plurality of edges or a wide sample value distribution based on a plurality of SAOs, thereby improving the video quality of an image.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to an embodiment of the present invention may be implemented in a software form. The encoder and/or decoder according to an embodiment of the present invention may be included in a device that performs image processing in, a for example, TV, a computer, a smart phone, a set-top box, a display device, and the like.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by an image decoder, the method comprising:
    obtaining information on a first Sample Adaptive Offset (SAO) and information on a second SAO of a current block through a bitstream;
    generating a reconstructed block of the current block; and
    performing an SAO procedure for the reconstructed block based on the first SAO and the second SAO,
    wherein the information on the first SAO comprises first offset type information applied to the first SAO and first offset value information on n offset values and the information on the second SAO comprises second offset type information applied to the second SAO and second offset value information on m offset values,
    wherein further comprising obtaining a syntax element for the number of SAOs for the current block through a bitstream,
    wherein the syntax element indicates how many SAOs are present in the SAO procedure of the current block, and the number of SAOs for the current block is obtained by adding 1 to a value of the syntax element for the number of SAOs,
    wherein when the value of the syntax element is 1, the number of SAOs for the current block is two, and the information on the first SAO and the information on the second SAO is obtained according to the number of SAOs for the current block.

2. The method of claim 1, wherein when both the first offset type information and the second offset type information represent an edge offset type,
    the first edge offset class of the first SAO and the second edge offset class of the second SAO are preset, and
    the first edge offset class is equal to the second edge offset class.

3. The method of claim 2, wherein the performing of the SAO procedure for the reconstructed block based on the first SAO and the second SAO comprises:
    deriving a threshold for a target sample in the reconstructed block;
    deriving an absolute value of a difference value between two reference samples according to the class;
    selecting one of the first SAO and the second SAO based on the absolute value;
    determining an edge offset category for the target sample based on the two reference samples and the target sample; and
    applying an offset value corresponding to the category among offset values of the selected SAO to the target sample.

4. The method of claim 3, wherein the threshold is a preset specific value.

5. The method of claim 3, wherein the threshold is a standard deviation of sample values of the reconstructed block.

6. The method of claim 1, wherein when both the first offset type information and the second offset type information represent an edge offset type, the information on the first SAO further comprises first edge offset class information, the information on the second SAO further comprises second edge offset class information, and a first edge offset class represented by the first edge offset class information and a second edge offset class represented by the second edge offset class information are not equal to each other.

7. The method of claim 6, wherein the performing of the SAO procedure for the reconstructed block based on the first SAO and the second SAO comprises:
deriving a first absolute value of a difference value between two reference samples according to the first edge offset class for a target sample in the reconstructed block;
deriving a second absolute value of a difference value between two reference samples according to the second edge offset class for the target sample;
selecting one of the first SAO and the second SAO based on the first absolute value and the second absolute value;
determining an edge offset category for the target sample based on the two reference samples and the target sample of the selected SAO; and
applying an offset value corresponding to the category among offset values of the selected SAO to the target sample.

8. The method of claim 1, when both the first offset type information and the second offset type information represent a band offset type, further comprising obtaining one band position information through the bit stream,
wherein the band position information is information indicating a start band among bands included in a band group, and the band group comprises bands corresponding to the n offset values of the first SAO and bands corresponding to the m offset values of the second SAO.

9. The method of claim 1, wherein when both the first offset type information and the second offset type information represent a band offset type, the information on the first SAO further comprises first band position information and the information on the second SAO further comprises second band position information, and
the first band position information is information indicating a start band among bands corresponding to the n offset values comprised in a first band group and the second band position information is information indicating a start band among bands corresponding to the m offset values comprised in a second band group.

10. The method of claim 9, wherein the performing of the SAO procedure for the reconstructed block based on the first SAO and the second SAO comprises:
deriving the first band group based on the first band position information;
deriving the second band group based on the second band position information;
applying an offset value corresponding to the first band among the n offset values to a first sample corresponding to a first band of the first band group among samples of the reconstructed block; and
applying an offset value corresponding to the second band among the m offset values to a second sample corresponding to a second band of the second band group among samples of the reconstructed block.

11. The method of claim 1, wherein when the first offset type information represents an edge offset type and the second offset type information represents a band offset type,
the information on the first SAO further comprises first edge offset class information, the information on the second SAO further comprises second band position information, and the second band position information is information indicating a start band among bands corresponding to the m offset values comprised in a second band group.

12. The method of claim 11, wherein the performing of the SAO procedure for the reconstructed block based on the first SAO and the second SAO comprises:
deriving a threshold for a target sample in the reconstructed block;
deriving an absolute value of a difference value between two reference samples according to a first edge offset class represented by the first edge offset class information; and
selecting one of the first SAO and the second SAO based on the threshold and the absolute value.

13. The method of claim 12, wherein when the first SAO is selected based on the threshold and the absolute value,
the performing of the SAO procedure for the reconstructed block based on the first SAO and the second SAO comprises:
determining an edge offset category for the target sample based on the two reference samples and the target sample of the first SAO; and
applying an offset value corresponding to the category among the offset values of the first SAO to the target sample.

14. The method of claim 12, wherein when the second SAO is selected based on the threshold and the absolute value,
the performing of the SAO procedure for the reconstructed block based on the first SAO and the second SAO comprises:
deriving the second band group based on the second band position information; and
applying an offset value corresponding to the band among the m offset values to a sample corresponding to the band of the second band group among samples of the reconstructed block.

* * * * *